(12) United States Patent
Chung

(10) Patent No.: US 10,274,905 B2
(45) Date of Patent: Apr. 30, 2019

(54) ELECTRONIC DEVICE

(71) Applicant: PIXART IMAGING INC., Hsin-Chu (TW)

(72) Inventor: Ching-Lin Chung, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/795,485

(22) Filed: Oct. 27, 2017

(65) Prior Publication Data

US 2018/0067459 A1 Mar. 8, 2018

Related U.S. Application Data

(63) Continuation-in-part of application No. 15/178,098, filed on Jun. 9, 2016, now Pat. No. 9,958,298.

(30) Foreign Application Priority Data

Mar. 7, 2016 (TW) .............................. 105106882 A

(51) Int. Cl.
| | |
|---|---|
| *G04G 21/08* | (2010.01) |
| *G01D 5/28* | (2006.01) |
| *G04F 3/08* | (2006.01) |
| *G01D 5/34* | (2006.01) |
| *G04B 19/22* | (2006.01) |
| *G01D 11/24* | (2006.01) |

(52) U.S. Cl.
CPC .............. *G04G 21/08* (2013.01); *G01D 5/28* (2013.01); *G01D 5/34* (2013.01); *G01D 11/245* (2013.01); *G04B 19/223* (2013.01); *G04F 3/08* (2013.01)

(58) Field of Classification Search
CPC ...... G01D 11/245; G01D 5/34; G04B 19/223; G04F 3/08; G04G 21/08
See application file for complete search history.

(56) References Cited

U.S. PATENT DOCUMENTS

| | | | | |
|---|---|---|---|---|
| 4,733,383 A | * | 3/1988 | Waterbury | G04G 21/02 368/10 |
| 2006/0237648 A1 | * | 10/2006 | Bushberg | G01T 1/02 250/336.1 |
| 2014/0361147 A1 | * | 12/2014 | Fei | G01J 1/0407 250/206 |

FOREIGN PATENT DOCUMENTS

CN 204406053 U * 6/2015 ............. G04B 47/06

* cited by examiner

*Primary Examiner* — David P Porta
*Assistant Examiner* — Fani Boosalis
(74) *Attorney, Agent, or Firm* — Li & Cai Intellectual Property (USA) Office

(57) ABSTRACT

An electronic device includes a case, a manipulation ring disposed on the case, a rotational unit, a waterproof member, and an optical tracking system (OTS) sensor. The case has a first chamber and a second chamber arranged outside the first chamber. The case has a thru-hole arranged between the first and second chambers. The rotational unit includes a shaft and a mating member arranged in the second chamber and connected to the shaft. The shaft has a first segment arranged in the first chamber and a second segment arranged in the thru-hole. The manipulation ring is spinable to rotate the mating member and the shaft. The waterproof member is configured to seal a gap between the second segment and an inner wall of the case defining the thru-hole. The OTS sensor is arranged in the first chamber and is corresponding in position to the first segment.

29 Claims, 7 Drawing Sheets ously rotatable along a central axis of the shaft. The mating member is abutted against the driving portion, and the manipulation ring is spinable to rotate the mating member by the driving portion. The OTS sensor is arranged in the first chamber. The OTS sensor is corresponding in position to the first segment for detecting a rotating angle of the first segment.

ELECTRONIC DEVICE

CROSS REFERENCE TO RELATED APPLICATION

This application is a continuation-in-part of U.S. application Ser. No. 15/178,098 filed on Jun. 9, 2016 and entitled "ELECTRONIC DEVICE WITH WATERPROOF STRUCTURE" now pending.

BACKGROUND OF THE INVENTION

1. Field of the Invention

The present disclosure relates to an electronic device; in particular, to an electronic device with a waterproof function.

2. Description of Related Art

A conventional electronic device (e.g., a smart watch) is provided with a magnetic sensor (e.g., a Hall sensor) for detecting the rotation of the bezel thereof. However, the installation of the magnetic sensor in the conventional electronic device needs to satisfy a high accuracy, and the magnetic sensor of the conventional electronic device is easily affected from an outer magnetic field.

SUMMARY OF THE INVENTION

The present disclosure provides an electronic device to effectively improve the drawbacks associated with conventional electronic devices (e.g., smart watches).

The present disclosure discloses an electronic device, which includes a case, a manipulation ring, a rotational unit, a waterproof member, and an optical tracking system (OTS) sensor. The case has a first chamber and a second chamber arranged outside the first chamber. The case has a thru-hole arranged between the first chamber and the second chamber. The manipulation ring is disposed on the case and includes a driving portion facing the case. The rotational unit includes a shaft and a mating member. The shaft passes through the thru-hole. The shaft has a first segment arranged in the first chamber and a second segment arranged in the thru-hole. The mating member is arranged in the second chamber and is connected to a portion of the shaft away from the first segment. The mating member and the shaft are synchronously rotatable along a central axis of the shaft. The mating member is abutted against the driving portion, and the manipulation ring is spinable to rotate the mating member by the driving portion. The waterproof member is configured to seal a gap between the second segment of the shaft and an inner wall of the case defining the thru-hole. The OTS sensor is arranged in the first chamber. The OTS sensor is corresponding in position to the first segment for detecting a rotating angle of the first segment.

The present disclosure also discloses an electronic device, which includes a case, a translucent trough, a manipulation ring, a rotational unit, and an OTS sensor. The case has a first chamber and a second chamber arranged outside the first chamber. The case has a thru-hole arranged between the first chamber and the second chamber. The translucent trough is connected to the case and is arranged in the first chamber. A space surroundingly defined by the translucent trough is in air communication with the second chamber through the thru-hole. The translucent trough is configured to separate the space and the second chamber from the first chamber. The manipulation ring is disposed on the case and includes a driving portion facing the case. The rotational unit includes a shaft and a mating member. The shaft is inserted into the space of the translucent trough by passing through the thru-hole. The shaft has a first segment arranged in the space of the translucent trough and a second segment arranged in the thru-hole. The mating member is arranged in the second chamber and is connected to a portion of the shaft away from the first segment. The mating member and the shaft are synchronously rotatable along a central axis of the shaft. The mating member is abutted against the driving portion, and the manipulation ring is spinable to rotate the mating member by the driving portion. The OTS sensor is arranged in the first chamber. The OTS sensor is corresponding in position to the first segment for detecting a rotating angle of the first segment.

The present disclosure further discloses an electronic device, which includes a case, a manipulation ring, a rotational unit, a waterproof member, and an OTS sensor. The case has a chamber and a thru-hole in air communication with an interior space and an exterior space of the chamber. The manipulation ring is disposed on the case and includes a driving portion facing the case. The rotational unit includes a shaft and a mating member. The shaft passes through the thru-hole, and the shaft has a first segment arranged in the chamber and a second segment arranged in the thru-hole. The mating member is arranged outside the chamber and is connected to a portion of the shaft away from the first segment. The mating member and the shaft are synchronously rotatable along a central axis of the shaft, the mating member is abutted against the driving portion, and the manipulation ring is spinable to rotate the mating member by the driving portion. The waterproof member is configured to seal a gap between the second segment of the shaft and an inner wall of the case defining the thru-hole. The OTS sensor is arranged in the chamber, and the OTS sensor is corresponding in position to the first segment for detecting a rotating angle of the first segment.

In summary, the rotating angle of the rotational unit driven by the manipulation ring in the present disclosure is detected by the OTS sensor, thereby avoiding an interference of an outer magnetic field. Moreover, the shaft is positioned in the thru-hole, and the electronic device is provided with the waterproof member (or the translucent trough), which is corresponding in position to the thru-hole, thereby preventing liquid or dust, which is located in the second chamber (or the exterior space of the chamber), from entering into the first chamber (or the chamber) through the thru-hole.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Figure 1:
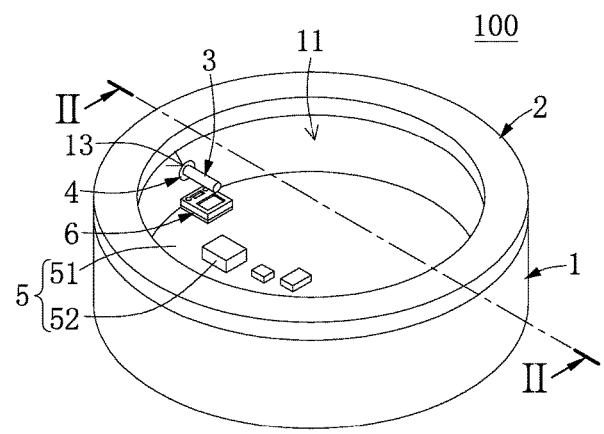
FIG. 1 is a perspective view showing an electronic device according to a first embodiment of the present disclosure.

Reference is made to FIGS. 1 to 10, which illustrate the present disclosure. References are hereunder made to the detailed descriptions and appended drawings in connection with the present disclosure. However, the appended drawings are merely provided for exemplary purposes, and should not be construed as restricting the scope of the present disclosure.

First Embodiment

Reference is first made to FIGS. 1 to 4, which illustrate an electronic device 100 (i.e., a smart watch) according to a first embodiment of the present disclosure. The electronic device 100 includes a case 1, a manipulation ring 2 disposed on the case 1, a rotational unit 3 and a waterproof member 4 both installed on the case 1, a circuit assembly 5, and an optical tracking system (OTS) sensor 6, the latter two of which are arranged in the case 1. The following description discloses the structure and connection of each component of the electronic device 100.

Figure 2:
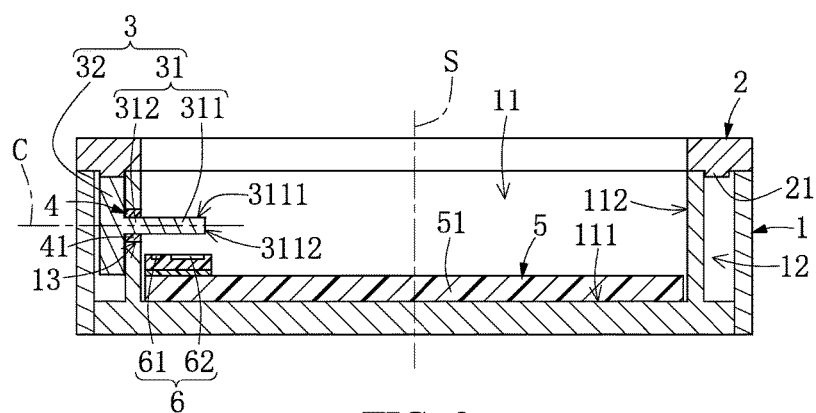
FIG. 2 is a cross-sectional view taken along a cross-sectional line II-II of FIG. 1.
Figure 3:
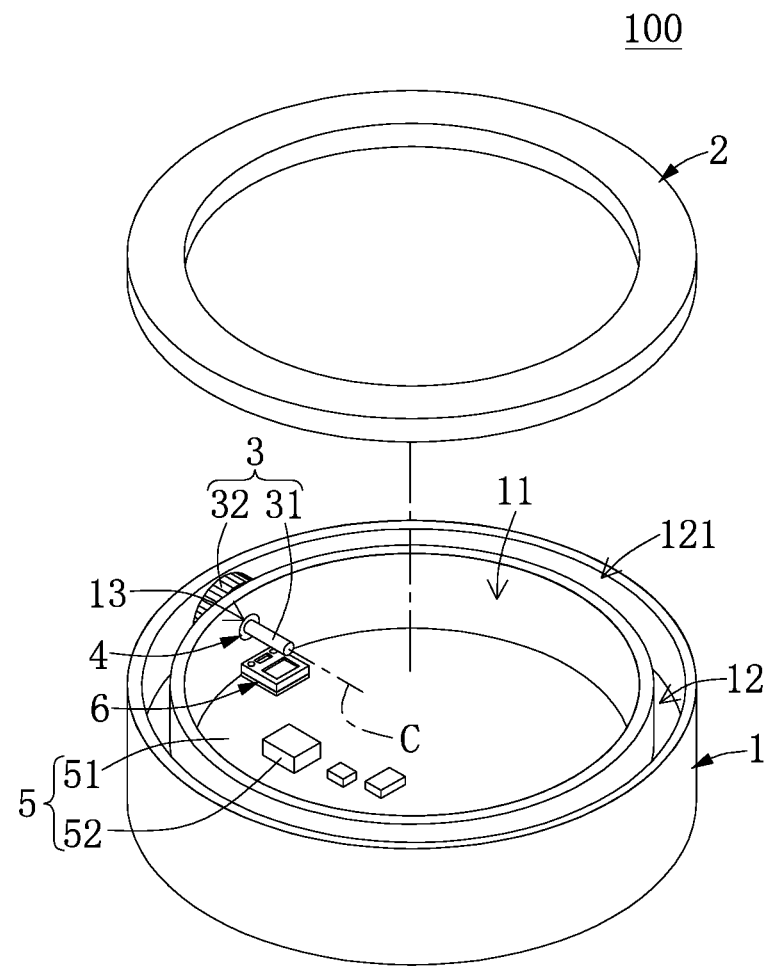
FIG. 3 is an exploded view of FIG. 1.

As shown in FIGS. 1 to 3, the case 1 in the present embodiment includes two pieces assembled with each other, but the present disclosure is not limited thereto. The case 1 includes a first chamber 11 and a second chamber 12 arranged outside the first chamber 11, and the case 1 has a thru-hole 13 arranged between the first chamber 11 and the second chamber 12.

The first chamber 11 has a round bottom surface 111 and a surrounding side surface 112 connected to an edge of the bottom surface 111. An interior space of the first chamber 11 is configured to accommodate the circuit assembly 5 and the OTS sensor 6, and the OTS sensor 6 is preferably arranged adjacent to the thru-hole 13, but the present disclosure is not limited thereto.

Figure 4:
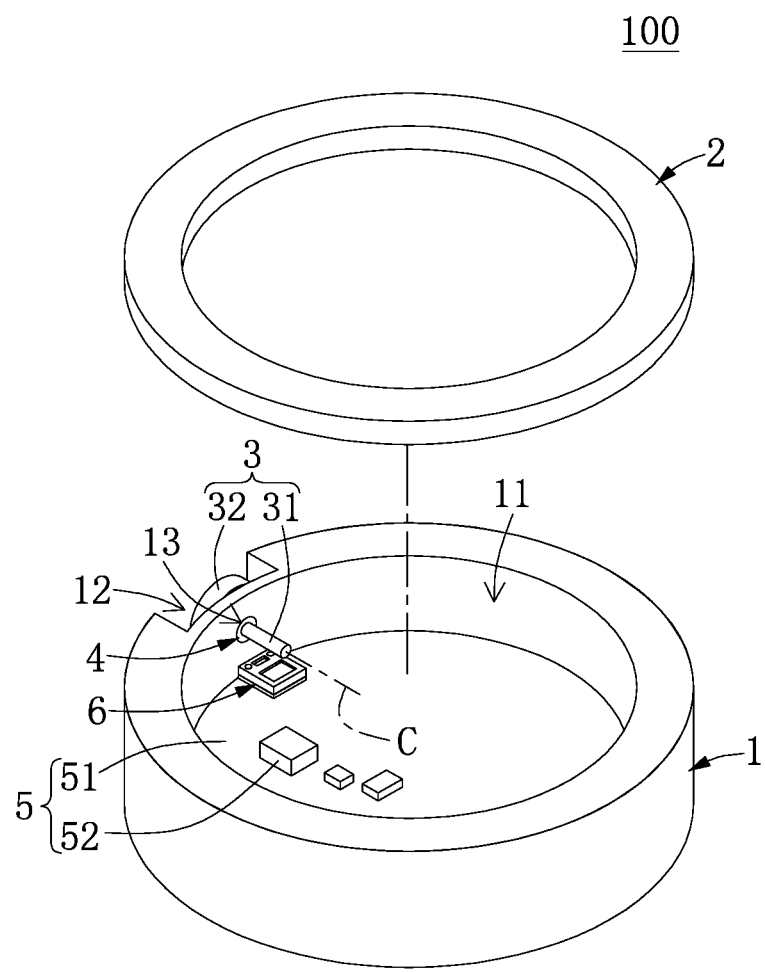
FIG. 4 is an exploded view of FIG. 1 in another structure.

Moreover, the second chamber 12 is connected to the first chamber 11. An interior space of the second chamber 12 is configured to accommodate a corresponding portion (i.e., a mating member 32) of the rotational unit 3. The second chamber 12 has an opening 121 formed on a top portion thereof, so that the corresponding portion of the rotational unit 3 can touch the manipulation ring 2 through the opening 121. Specifically, as shown in FIG. 3, the interior space of the second chamber 12 can be a round shape arranged around the first chamber 11; or, as shown in FIG. 4, the interior space of the second chamber 12 can be provided just for accommodating the corresponding portion (i.e., the mating member 32) of the rotational unit 3, but the present disclosure is not limited thereto.

The thru-hole 13 is recessed from the surrounding side surface 112 of the first chamber 11 to the second chamber 12, that is to say, the first chamber 11 and the second chamber 12 are in air communication with each other through the thru-hole 13.

The manipulation ring 2 (e.g., a bezel) is disposed on the case 1 and covers the opening 121 of the second chamber 12 of the case 1. The manipulation ring 2 includes a driving portion 21 facing the second chamber 12 of the case 1. The driving portion 21 of the present embodiment includes a plurality of teeth arranged on a bottom of the manipulation ring 2 in a circular arrangement, but the present disclosure is not limited thereto.

The rotational unit 3 includes a shaft 31 and a mating member 32 connected to the shaft 31. The shaft 31 and the mating member 32 in the present embodiment are integrally formed as one piece, but the present disclosure is not limited thereto. Moreover, in the present embodiment, the shaft 31 is a round shaft, and a cross-sectional area of the shaft 31 is smaller than that of the thru-hole 13.

Specifically, the shaft 31 passes through the thru-hole 13 of the case 1. The shaft 31 includes a first segment 311 arranged in the first chamber 11 and a second segment 312 arranged in the thru-hole 13. The first segment 311 of the shaft 31 has a surrounding surface 3111 and an end surface 3112 arranged distant from the mating member 32 (or the thru-hole 13).

The mating member 32 is connected to a portion of the shaft 31 (i.e., the second segment 312) arranged away from the first segment 311 and is arranged in the second chamber 12, such that the mating member 32 and the shaft 31 are synchronously rotatable along a central axis C of the shaft 31. The mating member 32 is abutted against the driving portion 21 of the manipulation ring 2, and the manipulation ring 2 is spinable to rotate the mating member 32 by the driving portion 21.

Specifically, the mating member 32 in the present embodiment is a gear integrally formed with the shaft 31, and the diameter of the gear is larger than that of the shaft 31, but the present disclosure is not limited thereto. Moreover, the gear is engaged with a part of the teeth of the manipulation ring 2 through the opening 121 of the second chamber 12. Thus, when the manipulation ring 2 is rotated along a spinning axis S substantially perpendicular to the central axis C of the shaft 31, the mating member 32 is driven by the engaged driving portion 21 to rotate the shaft 31.

In addition, the mating member 32 of FIG. 3 is a single gear, but in other embodiments of the present disclosure, the mating member 32 can include a plurality of gears engaged with each other, so that the gear ratio of the gears can be adjusted to effectively control a ratio of the rotating angle of the shaft 31 and the rotating angle of the manipulation ring 2.

Moreover, the driving portion 21 and the mating member 32 are not limited to FIG. 3, and can be adjusted according to the designer's demand. For example, as shown in FIG. 4, the interconnection between the driving portion 21 and the mating member 32 is established by a friction manner. Thus, the manipulation ring 2 is spinable to rotate the mating member 32 (and the shaft 31) by a friction force generated between the driving portion 21 and the mating member 32.

The waterproof member 4 is configured to seal a gap between the second segment 312 of the shaft 31 and an inner wall of the case 1 defining the thru-hole 13, and the waterproof member 4 does not block the rotation of the shaft 31. Specifically, the waterproof member 4 in the present embodiment is an O-ring 41 sleeved at the second segment 312 of the shaft 31 to seal the gap, thereby preventing liquid or dust, which is located in the second chamber 12, from entering into the first chamber 11 through the thru-hole 13. Moreover, in other embodiments of the present disclosure, the O-ring 41 can be sleeved at the first segment 311 of the shaft 31, or the waterproof member 4 can be a plurality of O-rings or other structures.

The circuit assembly 5 is arranged in the first chamber 11. The components of the circuit assembly 5 in the present embodiment can be adjusted according to the designer's demand, and the present disclosure is not limited thereto. For example, the circuit assembly 5 may include a circuit board 51 and a plurality of electronic components 52 (e.g., a processor, a wireless receiver, a wireless emitter, and an electricity charger) mounted on the circuit board 51. The circuit board 51 of the present embodiment is substantially parallel to and flatly disposed on the bottom surface 111 of the chamber 11.

The OTS sensor 6 is arranged in the first chamber 11 of the case 1 and is fixed on the circuit board 51. The OTS sensor 6 is corresponding in position to the first segment 311 of the shaft 31 for detecting a rotating angle of the first segment 311. For example, the OTS sensor 6 is arranged in a projecting path defined by orthogonally projecting the first segment 311 onto the bottom surface 111 of the first chamber 11, but the present disclosure is not limited thereto.

It should be noted that the electronic device 100 in the present embodiment is provided without any lens arranged between the first segment 311 of the shaft 31 and the OTS sensor 6, so that the thickness of the electronic device 100 can be effectively reduced.

Specifically, the OTS sensor 6 in the present embodiment includes a light emitting unit 61 and an optical navigation chip 62, and the light emitting unit 61 includes a laser diode or a light emitting diode. The light emitting unit 61 is configured to emit light onto the first segment 311 of the shaft 31 (i.e., the surrounding surface 3111 of the first segment 311), and the optical navigation chip 62 is configured to receive the light reflected by the first segment 311. Thus, the optical navigation chip 62 can immediately obtain a surface pattern of the first segment 311 according to the received light, and the circuit assembly 5 (i.e., the processor) can estimate the rotating angle of the first segment 311 by analyzing the surface pattern transmitted from the optical navigation chip 62.

Moreover, the rotating angle of the first segment 311 detected by the OTS sensor 6 can be used to control the electronic device 100 and a corresponding device (e.g., a watch core installed in the first chamber 11) by the circuit assembly 2 (i.e., the circuit board 21, the processor, and the wireless emitter).

Second Embodiment

Figure 5:
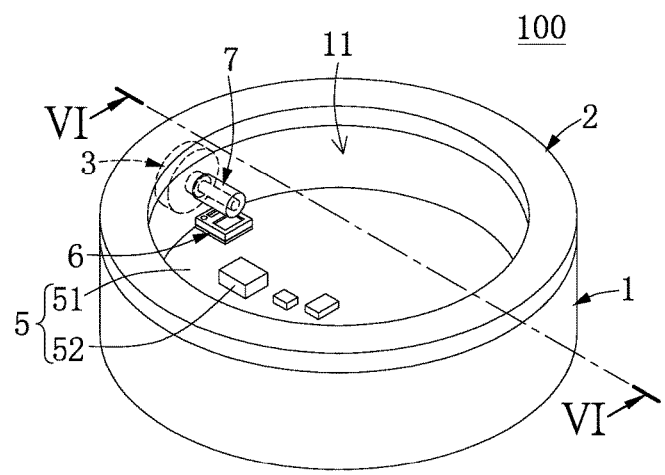
FIG. 5 is a perspective view showing the electronic device according to a second embodiment of the present disclosure.
Figure 6:
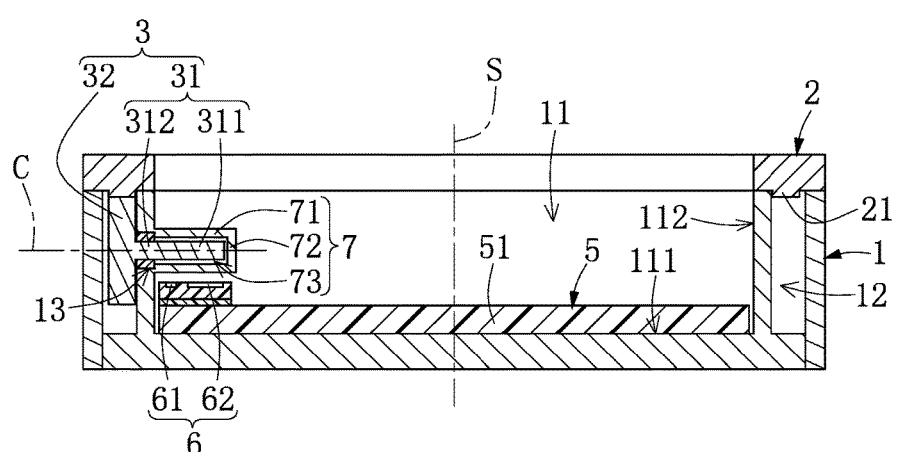
FIG. 6 is a cross-sectional view taken along a cross-sectional line VI-VI of FIG. 5.
Figure 7:
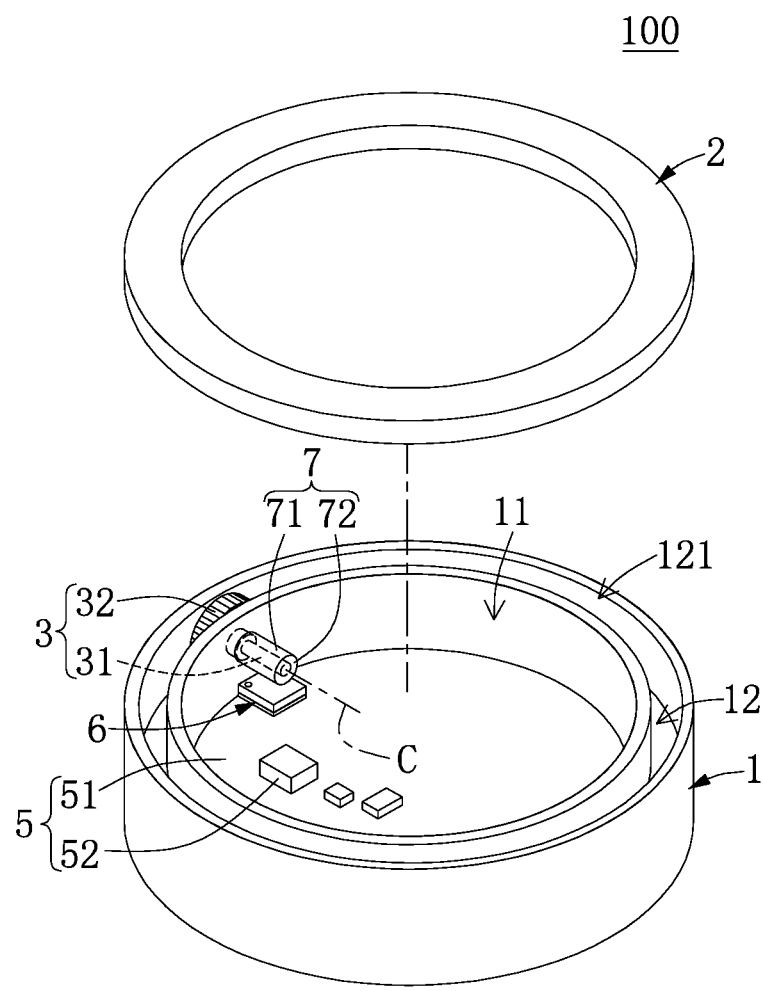
FIG. 7 is an exploded view of FIG. 5.

Reference is made to FIGS. 5 to 7, which illustrate a second embodiment of the present disclosure. The second embodiment is similar to the first embodiment, and the difference between the two embodiments is disclosed as follows.

Specifically, the electronic device 100 of the present embodiment includes a case 1, a translucent trough 7 connected to the case 1, a manipulation ring 2 disposed on the case 1, a rotational unit 3 installed on the case 1, a circuit assembly 5, and an optical tracking system (OTS) sensor 6, the latter two of which are arranged in the case 1.

The case 1, the manipulation ring 2, the rotational unit 3, the circuit assembly 5, and the OTS sensor 6 in the present embodiment is approximately identical to that of the first embodiment, such that the following description does not disclose the structure of each of the manipulation ring 2, the rotational unit 3, the circuit assembly 5, and the OTS sensor 6. In other words, the electronic device 100 of the present embodiment is provided with a waterproof function by using the translucent trough 7. The following description discloses the structure of the translucent trough 7 and the connection between the translucent trough 7 and the other components of the electronic device 100.

The translucent trough 7 is arranged in the first chamber 11 of the case 1 and is perpendicularly connected to the surrounding side surface 112. A space 73 surroundingly defined by the translucent trough 7 is in air communication with the second chamber 12 through the thru-hole 13. That is to say, the translucent trough 7 is configured to separate the space 73 and the second chamber 12 from the first chamber 11, thereby preventing liquid or dust, which is located in the second chamber 12, from entering into the first chamber 11 through the thru-hole 13.

Specifically, the translucent trough 7 in the present embodiment is transparent and includes a tube-like portion 71 and a covering portion 72. An end of the tube-like portion 71 is connected to the edge of the covering portion 72, and the other end of the tube-like portion 71 is connected to the surrounding side surface 112 of the first chamber 11 and is arranged around the thru-hole 13. The tube-like portion 71 in the present embodiment is a round tube, and an inner diameter of the tube-like portion 71 is preferably larger than or equal to that of the thru-hole 13.

The shaft 31 of the rotational unit 3 is inserted into the space 73 of the translucent trough 7 by passing through the thru-hole 13. The shaft 31 includes a first segment 311 arranged in the space 73 of the translucent trough 7 and a second segment 312 arranged in the thru-hole 13. Specifically, the first segment 311 of the shaft 31 is rotatably disposed in the tube-like portion 71.

The OTS sensor 6 is arranged in a projecting path defined by orthogonally projecting the first segment 311 (or the tube-like portion 71) onto the bottom surface 111 of the first chamber 11. The light emitting unit 61 of the OTS sensor 6 is configured to emit light onto the first segment 311 of the shaft 31 (i.e., the surrounding surface 3111) through the translucent trough 7, and the optical navigation chip 62 is configured to receive the light reflected by the first segment 311 and passing through the translucent trough 7. Thus, the optical navigation chip 62 can immediately obtain a surface pattern of the first segment 311 according to the received light, and the circuit assembly 5 (i.e., the processor) can estimate the rotating angle of the first segment 311 by analyzing the surface pattern transmitted from the optical navigation chip 62.

Moreover, the rotating angle of the first segment 311 detected by the OTS sensor 6 can be used to control the electronic device 100 and a corresponding device (e.g., a watch core installed in the first chamber 11) by the circuit assembly 2 (i.e., the circuit board 21, the processor, and the wireless emitter).

In addition, the translucent trough 7 in the present embodiment is transparent, but the present disclosure is not limited thereto. For example, in other embodiments of the present disclosure, a portion of the translucent trough 7 arranged adjacent to the OTS sensor 6 is transparent, and the other portion of the translucent trough 7 is not transparent.

Third Embodiment

Figure 8:
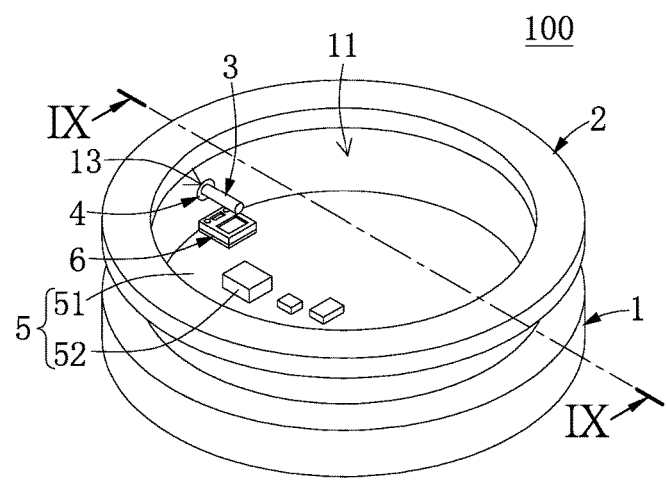
FIG. 8 is a perspective view showing the electronic device according to a third embodiment of the present disclosure.
Figure 9:
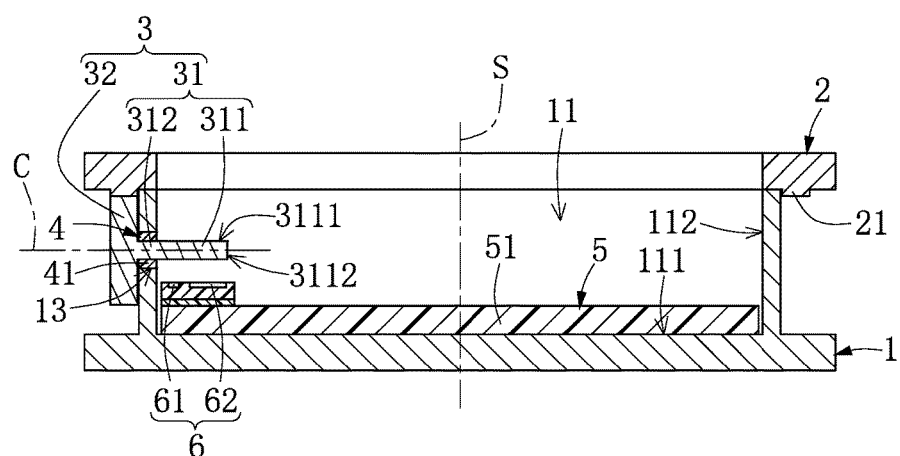
FIG. 9 is a cross-sectional view taken along a cross-sectional line IX-IX of FIG. 8.
Figure 10:
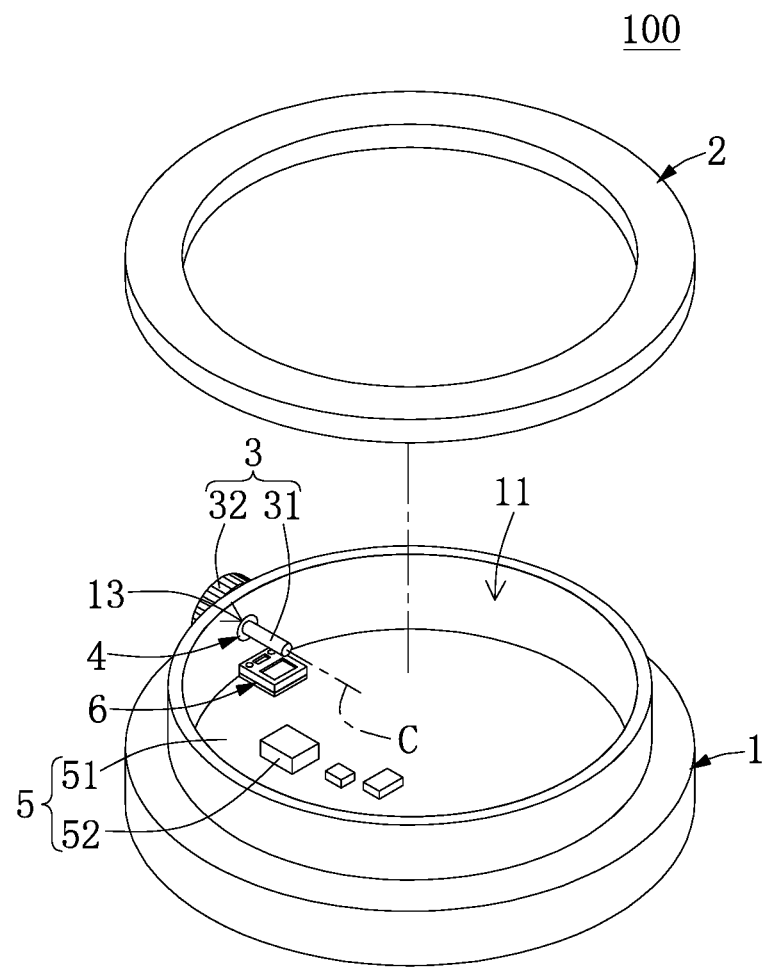
FIG. 10 is an exploded view of FIG. 8.

Reference is made to FIGS. 8 to 10, which illustrate a third embodiment of the present disclosure. The third embodiment is similar to the first embodiment, and the difference between the two embodiments is disclosed as follows.

The case 1 in the present embodiment is provided without the second chamber 12, in other words, the case 1 has a chamber 11, which is substantially identical to the first chamber 11 disclosed in the first embodiment, and a thru-hole 13 in air communication with an interior space and an exterior space of the chamber 11. Accordingly, the mating member 32 is arranged outside the chamber 11, and the thru-hole 13 is recessed from the surrounding side surface 112 of the chamber 11 to the exterior space of the chamber 11.

[The Effects of the Above Embodiments]

In summary, the rotating angle of the rotational unit 3 driven by the manipulation ring 2 in the present disclosure is detected by the OTS sensor 6, thereby avoiding an interference of an outer magnetic field. Moreover, the shaft 31 is positioned in the thru-hole 13, and the electronic device 100 is provided with the waterproof member 4 (or the translucent trough 7), which is corresponding in position to the thru-hole 13, thereby preventing liquid or dust, which is located in the second chamber 12 (or the exterior space of the chamber 11), from entering into the first chamber 11 (or the chamber 11) through the thru-hole 13.

In addition, the position of the shaft 31 is suitable to be detected by the OTS sensor 6, but the central axis C of the shaft 31 is perpendicular to the spinning axis S, so that the mating member 32 of the electronic device 100 is used to accurately transfer the rotating angle of the manipulation ring 2 into the rotating angle of the shaft 31.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An electronic device, comprising:
   a case having a first chamber and a second chamber arranged outside the first chamber, wherein the case has a thru-hole arranged between the first chamber and the second chamber;
   a manipulation ring disposed on the case and including a driving portion facing the case;
   a rotational unit including:
      a shaft passing through the thru-hole, wherein the shaft has a first segment arranged in the first chamber and a second segment arranged in the thru-hole; and
      a mating member arranged in the second chamber and connected to a portion of the shaft away from the first segment, wherein the mating member and the shaft are synchronously rotatable along a central axis of the shaft, the mating member is abutted against the driving portion, and the manipulation ring is spinable to rotate the mating member by the driving portion;
   a waterproof member configured to seal a gap between the second segment of the shaft and an inner wall of the case defining the thru-hole; and
   an optical tracking system (OTS) sensor arranged in the first chamber, wherein the OTS sensor is corresponding in position to the first segment for detecting a rotating angle of the first segment.

2. The electronic device as claimed in claim 1, wherein the driving portion includes a plurality of teeth arranged on a bottom of the manipulation ring in a circular arrangement, and the mating member includes a gear engaged with a part of the teeth of the manipulation ring.

3. The electronic device as claimed in claim 2, wherein a diameter of the gear is larger than that of the shaft, and the shaft and the gear are integrally formed as one piece.

4. The electronic device as claimed in claim 1, wherein the manipulation ring is spinable to rotate the mating member by a friction force generated between the driving portion and the mating member.

5. The electronic device as claimed in claim 1, wherein the waterproof member includes an O-ring sleeved at the shaft to seal the gap.

6. The electronic device as claimed in claim 1, wherein the first segment of the shaft has a surrounding surface and an end surface arranged distant from the mating member, and the OTS sensor is configured to emit light onto the surrounding surface of the first segment.

7. The electronic device as claimed in claim 1, wherein the first chamber has a bottom surface and a surrounding side surface, the thru-hole is recessed from the surrounding side surface of the first chamber to the second chamber, and the OTS sensor is arranged in a projecting path defined by orthogonally projecting the first segment onto the bottom surface.

8. The electronic device as claimed in claim 1, wherein the OTS sensor includes a light emitting unit and an optical navigation chip, the light emitting unit is configured to emit light onto the first segment of the shaft, and the optical navigation chip is configured to receive the light reflected by the first segment.

9. The electronic device as claimed in claim 8, wherein the light emitting unit includes a laser diode or a light emitting diode.

10. The electronic device as claimed in claim 1, wherein the second chamber is arranged around the first chamber, and the manipulation ring is spinable along a spinning axis substantially perpendicular to the central axis of the shaft.

11. An electronic device, comprising:
    a case having a first chamber and a second chamber arranged outside the first chamber, wherein the case has a thru-hole arranged between the first chamber and the second chamber;
    a translucent trough connected to the case and arranged in the first chamber, wherein a space surroundingly defined by the translucent trough is in air communication with the second chamber through the thru-hole, and the translucent trough is configured to separate the space and the second chamber from the first chamber;
    a manipulation ring disposed on the case and including a driving portion facing the case;
    a rotational unit including:
       a shaft inserted into the space of the translucent trough by passing through the thru-hole, wherein the shaft has a first segment arranged in the space of the translucent trough and a second segment arranged in the thru-hole; and
       a mating member arranged in the second chamber and connected to a portion of the shaft away from the first segment, wherein the mating member and the shaft are synchronously rotatable along a central axis of the shaft, the mating member is abutted against the driving portion, and the manipulation ring is spinable to rotate the mating member by the driving portion; and
    an optical tracking system (OTS) sensor arranged in the first chamber, wherein the OTS sensor is corresponding in position to the first segment for detecting a rotating angle of the first segment.

12. The electronic device as claimed in claim 11, wherein the driving portion includes a plurality of teeth arranged on a bottom of the manipulation ring in a circular arrangement, and the mating member includes a gear engaged with a part of the teeth of the manipulation ring.

13. The electronic device as claimed in claim 12, wherein a diameter of the gear is larger than that of the shaft, and the shaft and the gear are integrally formed as one piece.

14. The electronic device as claimed in claim 11, wherein the manipulation ring is spinable to rotate the mating member by a friction force generated between the driving portion and the mating member.

15. The electronic device as claimed in claim 11, wherein the translucent trough being transparent includes a tube-like portion and a covering portion, an end of the tube-like portion is connected to a periphery edge of the covering portion, and the other end of the tube-like portion is connected to the first chamber and is arranged around the thru-hole, wherein the first segment is arranged in the tube-like portion.

16. The electronic device as claimed in claim 11, wherein the first segment of the shaft has a surrounding surface and an end surface arranged distant from the mating member, and the OTS sensor is configured to emit light onto the surrounding surface of the first segment through the translucent trough.

17. The electronic device as claimed in claim 11, wherein the first chamber has a bottom surface and a surrounding side surface, the thru-hole is recessed from the surrounding side surface of the first chamber to the second chamber, the translucent trough is perpendicularly connected to the surrounding side surface, and the OTS sensor is arranged in a projecting path defined by orthogonally projecting the first segment onto the bottom surface.

18. The electronic device as claimed in claim 11, wherein the OTS sensor includes a light emitting unit and an optical navigation chip, the light emitting unit is configured to emit light onto the first segment of the shaft through the translucent trough, and the optical navigation chip is configured to receive the light reflected by the first segment and passing through the translucent trough.

19. The electronic device as claimed in claim 18, wherein the light emitting unit includes a laser diode or a light emitting diode.

20. The electronic device as claimed in claim 11, wherein the second chamber is arranged around the first chamber, and the manipulation ring is spinable along a spinning axis substantially perpendicular to the central axis of the shaft.

21. An electronic device, comprising:
a case having a chamber and a thru-hole in air communication with an interior space and an exterior space of the chamber;
a manipulation ring disposed on the case and including a driving portion facing the case;
a rotational unit including:
a shaft passing through the thru-hole, wherein the shaft has a first segment arranged in the chamber and a second segment arranged in the thru-hole; and
a mating member arranged outside the chamber and connected to a portion of the shaft away from the first segment, wherein the mating member and the shaft are synchronously rotatable along a central axis of the shaft, the mating member is abutted against the driving portion, and the manipulation ring is spinable to rotate the mating member by the driving portion;
a waterproof member configured to seal a gap between the second segment of the shaft and an inner wall of the case defining the thru-hole; and
an optical tracking system (OTS) sensor arranged in the chamber, wherein the OTS sensor is corresponding in position to the first segment for detecting a rotating angle of the first segment.

22. The electronic device as claimed in claim 21, wherein the driving portion includes a plurality of teeth arranged on a bottom of the manipulation ring in a circular arrangement, and the mating member includes a gear engaged with a part of the teeth of the manipulation ring.

23. The electronic device as claimed in claim 22, wherein a diameter of the gear is larger than that of the shaft, and the shaft and the gear are integrally formed as one piece.

24. The electronic device as claimed in claim 21, wherein the manipulation ring is spinable to rotate the mating member by a friction force generated between the driving portion and the mating member.

25. The electronic device as claimed in claim 21, wherein the waterproof member includes an O-ring sleeved at the shaft to seal the gap.

26. The electronic device as claimed in claim 21, wherein the first segment of the shaft has a surrounding surface and an end surface arranged distant from the mating member, and the OTS sensor is configured to emit light onto the surrounding surface of the first segment.

27. The electronic device as claimed in claim 21, wherein the chamber has a bottom surface and a surrounding side surface, the thru-hole is recessed from the surrounding side surface of the chamber to the exterior space of the chamber, and the OTS sensor is arranged in a projecting path defined by orthogonally projecting the first segment onto the bottom surface.

28. The electronic device as claimed in claim 21, wherein the OTS sensor includes a light emitting unit and an optical navigation chip, the light emitting unit is configured to emit light onto the first segment of the shaft, and the optical navigation chip is configured to receive the light reflected by the first segment.

29. The electronic device as claimed in claim 28, wherein the light emitting unit includes a laser diode or a light emitting diode.

* * * * *